Aug. 22, 1944.　　L. R. NIXON　　2,356,341
ELECTRIC REGULATOR
Filed May 7, 1943
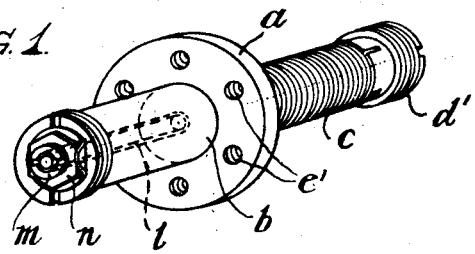
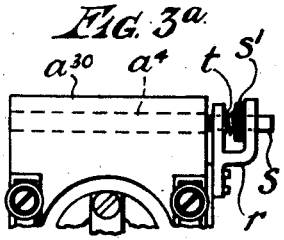
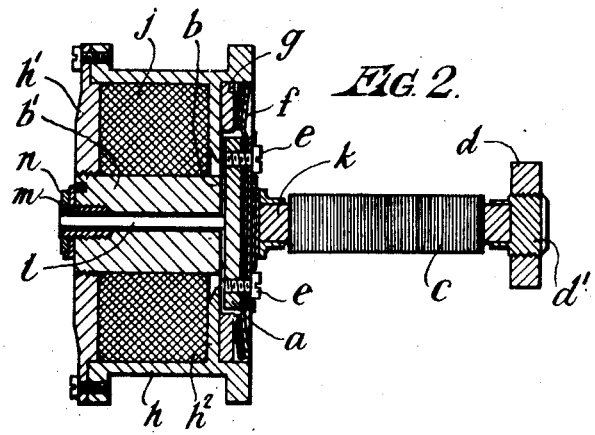
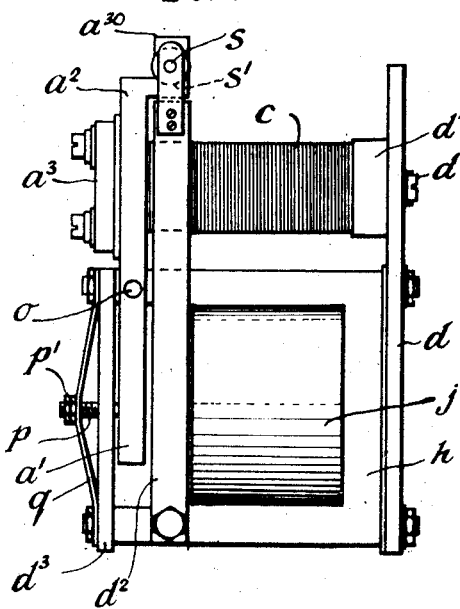
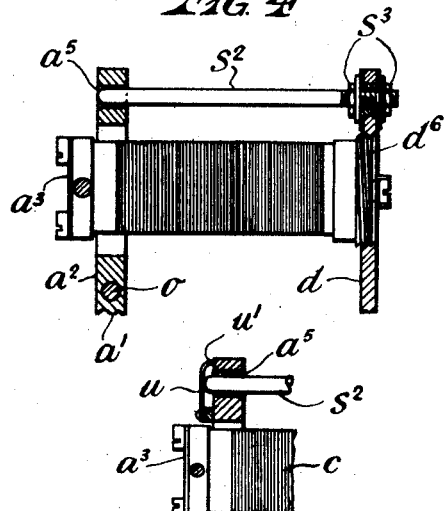
Inventor
Leslie R. Nixon
by Sommers + Young
Attorneys Patented Aug. 22, 1944

2,356,341

UNITED STATES PATENT OFFICE 2,356,341

ELECTRIC REGULATOR

Leslie Reginald Nixon, New Eltham, London, England, assignor to J. Stone & Company Limited, Deptford, England, a British joint-stock company Application May 7, 1943, Serial No. 486,033
In Great Britain June 8, 1942

5 Claims. (Cl. 201—51)

This invention comprises improvements in or connected with electric regulators of the carbon pile type and has for object the provision in such regulators of improved visual resetting means in the form of an adjustable gauge device co-operative with the armature or means associated therewith. Such re-setting indicators are of importance in the maintenance of carbon pile regulators as they enable any given regulator, at any time, to be reset to its original condition of adjustment in spite of the effects of wear and tear or replacement of carbon rings or discs, and without the use of a voltmeter or other instrument and without having to put the regulator into circuit. When a new regulator is produced, it is tested in the laboratory and given the most advantageous individual setting shown by the test. A resetting indicator enables that initial individual setting to be restored at any time during the use of the regulator and without having to return it to the laboratory, or otherwise make electrical tests under possibly awkward conditions. Thus, a resetting indicator is a valuable adjunct when having regard to simple, efficient and reliable maintenance of carbon pile regulators such as are used in aircraft and vehicle installations.

The principal object of the present invention is to devise simple and reliable resetting indicators capable of giving a clear indication but so adapted as to avoid interference with the operation of the regulator at any time and particularly such interference as may occur if the resetting indicator becomes at any time an abutment or stop for the armature.

According to this invention a resetting indicator for a carbon pile regulator is distinguished by a gauge rod or pin arranged to co-operate with an aperture, whereby such rod or pin cannot impede the working of the armature during normal operations of the regulator. Such gauge rod or pin may be carried by the armature and may work in a bore formed in a core part of the magnet, the end of the rod or pin being in indicative relation with the mouth of a bore formed in a bushing adjustably screwed into the bore of the said core part. Or, the gauge rod or pin may be slidably mounted in a fixed part and be normally retained by a spring in a withdrawn position, the said pin being movable into a co-operative aperture in an armature part when a test is to be made. Or, the gauge rod or pin may be fixedly mounted and may operate in indicative relation with an aperture formed in an armature part, or may extend through such aperture and have operative connection with an indicator in the shape of a flexible pointer or blade spring indicator mounted on such armature part.

In order to enable the invention to be readily understood, reference is made to the accompanying drawing, wherein:

Figure 1 is a perspective view illustrating the application of these improvements to a carbon pile regulator wherein the pile compression is varied by the attraction of a disc-form armature to a central pole.

Figure 2 is a longitudinal sectional view of a regulator incorporating the parts illustrated in Figure 1.

Figure 3 is an elevation illustrating the application of these improvements to a carbon pile regulator wherein the pile compression is varied by the attraction of a clapper form of armature to its magnet.

Figure 3a is an elevation of the top portion of Figure 3 as viewed from the left hand side.

Figures 4 and 5 are sectional fragmental views illustrating modifications of the arrangement illustrated in Figure 3.

Referring to Figures 1 and 2, the present improvements are therein illustrated as applied to a carbon pile regulator of known construction, wherein an armature $a$ of disc-form is attracted by a central magnet pole $b$ for varying the compression of a carbon pile $c$, one end of the pile being rigidly supported by a screw plug $d^1$. As will be seen from Figure 2, the plug $d^1$ is screwed through a frame plate $d$ and can be screwed in or out for adjusting the pile $c$ bodily in the direction of its longitudinal axis. The disc armature $a$ is secured by a circular series of screws $e$ (only the screw holes $e^1$ are seen in Figure 1) to an annular plate spring $f$ which presses with its peripheral portions against a seating means $g$ supported in the pot or casing $h$ enclosing the magnet coil $j$. When the magnet is de-energized, the spring $f$ is bowed outwardly towards the pile $c$ and influences a presser device $k$ to impart maximum compression to the pile $c$ which is rigidly supported at its other end by the plug $d^1$ as aforesaid. The pole $b$ is provided by a cylindrical core piece $b^1$ which is screwed into the outer wall $h^1$ of the pot $h$, the inner wall $h^2$ of the pot being annular so as to provide the usual polar gap between the inner periphery of such wall and the pole $b$. When the magnet is sufficiently energized, the armature $a$ is attracted towards the pole $b$, thereby deflecting the spring $f$ and reducing the compression of the pile $c$.

The magnet system and the arrangement of the pile $c$ in connection therewith are known and require no further description.

According to the present improvements, and as seen in Figures 1 and 2, a gauge rod $l$ is fixed to the centre of the disc-armature $a$ and is passed freely through a central bore in the core $b^1$. At its outer end, the bore is enlarged to receive an adjustable screw threaded hollow plug or bush $m$ which can be locked in desired positions of adjustment as by means of the nut and locking washer indicated at $n$. The rod $l$ extends freely also through the hole in the plug or bush $m$ and is of such a length that its extremity appears in the mouth of such hole, as shown. When the regulator is tested before going into service, an approved setting is arrived at finally by adjusting the abutment plug or ferrule $d^1$ of the pile, so that the latter is under an appropriate pressure applied by the spring $f$ when the magnet is deenergized. The bush $m$ is then adjusted in the core $b^1$ so that the mouth of its hole is flush with the extremity of the rod $l$. The latter serves as a visual indicator or gauge as the presence of its extremity flush with the mouth of the hole in the bush $m$ can be easily observed and can be checked by finger touch. If the pile $c$ shrinks in service, the armature $a$ moves away from the pole $b$ with the result that the gauge rod $l$ is withdrawn a little so that its extremity recedes within the mouth of the hole in the bush $m$. The regulator can then be reset by screwing in the plug or ferrule $d^1$ until the extremity of the rod $l$ is again flush with the mouth of the hole in the bush $m$, this being a sure indication that the original setting of the regulator has been restored.

In the example illustrated in Figures 3 and 3a, the armature $a^1$ is of the clapper type, being mounted on a pivot $o$ supported by the framing which comprises the base plate $d$ and frame bars $d^2$. The electro-magnet comprises the pot or casing $h$ and coil $j$. A screw threaded post $p$ fixedly mounted on the armature extends freely through a hole in the frame plate $d^3$ and through a hole in a bow spring $q$ bearing with its ends against the plate $d^3$, nuts $p^1$ screwed on the post $p$ being adjusted for compressing the spring $q$ to a desired degree. An extension $a^2$ of the armature beyond the pivot $o$ is provided with presser means $a^3$ for engaging with the end of the pile $c$ and pressing the latter rightwardly against an abutment ferrule $d^4$ which is endwise adjustable by means of a screw $d^5$ adjustable in a screw threaded hole in the base plate $d$. On the frame bars $d^2$ there is fixedly mounted a forked bracket $r$, and a slidable gauge pin $s$ is guidingly mounted in holes formed in the prongs of the bracket $r$, a milled collar $s^1$ being fixedly mounted on the pin $s$. A spring $t$ coiled around the pin $s$ and in compression between the collar $s^1$ and one prong of the bracket $r$ normally maintains the pin $s$ in the withdrawn position illustrated. A stepped end portion $a^{30}$ of the armature extension $a^2$ has a perforation $a^4$ which normally should lie in axial alignment with the pin $s$. The diameter of the hole $a^4$ is such that the pin $s$ may have a sliding fit therein. When the magnet is de-energized, it will be seen that the spring $q$ acting against the nuts $p^1$ keeps the armature $a^1$ away from the magnet pole and thereby maintains the presser means $a^3$ against the pile $c$ to put the latter under compression. This compression, in the setting of the regulator before going into service, is finally adjusted by means of the screw $d^5$ in the usual manner. In the adjusted condition of the regulator, the hole $a^4$ is axially aligned with the pin $s$ so that the latter when moved leftwardly in Figure 3a by means of its collar $s^1$ will freely enter the hole $a^4$. When shrinkage of the pile $c$ occurs in service, the clapper $a^1 a^2$, being pivotally mounted, assumes a new angular position which takes the hole $a^4$ out of axial alignment with the pin $s$. Consequently, when the pin $s$ is pressed against the action of the spring $t$ it fails to enter the hole $a^4$ freely. This is a clear indication that a resetting of the pile $c$ by adjusting the screw $d^5$ must then be performed until the pin $s$ can enter freely into the hole $a^4$. If desired the pin $s$ may be formed with a slight lead or taper at that end which enters the hole $a^4$. This enables the pin $s$ to be forced into the hole $a^4$ with wedge-tightness when the pile has shrunk and the said hole $a^4$ is out of axial alignment with the pin $s$. When a test is made and the pin $s$ remains wedged in the hole $a^4$ it is evident that re-setting is necessary. The screw $d^5$ should then be adjusted for correct resetting of the pile $c$ and this restores the hole $a^4$ to axial alignment with the pin $s$, whereupon the pin $s$ is released (being no longer wedged) and restored by its spring $t$ to the withdrawn position seen in Figure 3a.

According to the modification illustrated in Figure 4, the extension $a^2$ of the armature of Figure 3 is provided in its extremity with a hole $a^5$ and this hole freely encloses the end portion of a gauge pin $s^2$ adjustably mounted by means of nuts $s^3$ on the base plate $d$. When the pile $c$ is correctly adjusted by means of its adjustment plug $d^6$, the tip of the pin $s^2$ lies flush with the mouth of the hole $a^5$ as shown but when the pile shrinks in service, the said tip will protrude through the hole $a^5$ and indicate that a resetting operation is necessary.

If desired, and as shown in Figure 5, the pin $s^2$ of Figure 4 may normally protrude through the hole $a^5$ and just make contact with a blade spring $u$ bent at its extremity to form a beak $u^1$ which normally rests against the surface of the extension $a^2$ of the armature. When the pile $c$ shrinks, the tip of the pin $s^2$ becomes further protruded from the hole $a^5$ as already explained and this causes deflection of the spring $u$ and a moving of the beak $u^1$ away from the surface against which it rested. This is readily observed upon inspection and affords a clear indication that resetting of the pile $c$ is required. The blade spring $u$ may be of a greater length than that in the example illustrated so that the beak $u^1$ or other indicator device on its end is situated at a greater distance from the pin $s^2$. With such an arrangement a beak $u^1$ or pointer at the end of the spring $u$ would give a greatly enlarged indication of relative movement between the extension $a^2$ and the pin $s^2$, thereby providing an unmistakable warning that resetting of the pile $c$ is required.

In all the constructions hereinbefore described it will be observed that the gauge rod or pin does not interfere with the operation of the armature during working conditions. In each case, the gauge pin or rod cooperates with an aperture and cannot act as an abutment stop in the path of the armature or armature extension, so that armature movement cannot be arrested by such gauge rod or pin when shrinkage of the pile $c$ occurs during service.

I claim:

1. An electric regulator comprising a carbon pile, spring means operative for compressing said pile, magnet-operated means operative for varying the compression of said pile, an adjustment operative for moving said pile bodily for adjusting the spring loading of such pile, and a gauge device comprising a pin movable relatively to an aperture and adapted for indicating the setting of the pile without impeding the working of the regulator.

2. An electric regulator comprising a carbon pile, spring means operative for compressing said pile, magnet operated means operative for varying the compression of said pile, an adjustment operative for moving said pile bodily for adjusting the spring loading of such pile, and a gauge pin mounted on said magnet-operated means and operating in indicative relation with an aperture for indicating the seting of the pile.

3. An electric regulator comprising a carbon pile, spring means operative for compressing said pile, magnet operated means operative for varying the compression of said pile, an adjustment operative for moving said pile bodily for adjusting the spring loading of such pile, and a gauge pin supported by a fixed part of the regulator and co-operating with an aperture in the magnet-operated means for giving indications as to the setting of the pile.

4. An electric regulator as claimed in claim 3, wherein the gauge pin is slidably mounted in the fixed part of the regulator so as to be movable into and out of indicative relation with the aperture in the magnet-operated means.

5. An electric regulator comprising a carbon pile, spring means operative for compressing said pile, magnet-operated means operative for varying the compression of said pile, an adjustment operative for moving said pile bodily for adjusting the spring loading of such pile, a gauge pin and aperture adapted for movement relatively to one another in accordance with changes in the length or setting of the pile, and an indicator device in operative relation with said gauge pin and adapted for giving a magnified indication of said movement.

LESLIE REGINALD NIXON.